(No Model.)
R. H. KRALL & J. E. DUTT.
WINDOW SCREEN OR OTHER SLIDE.
No. 426,620. Patented Apr. 29, 1890.
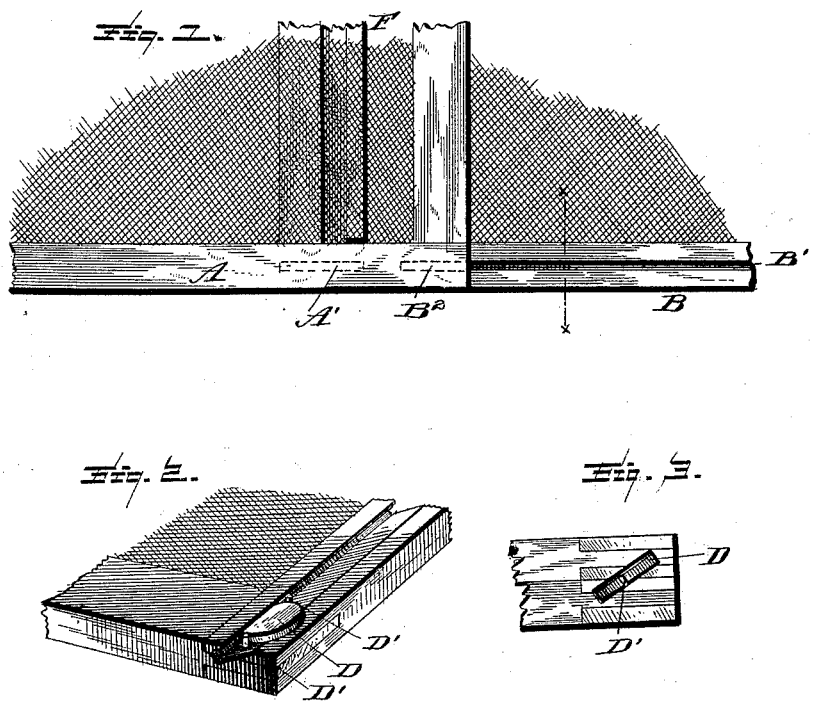

UNITED STATES PATENT OFFICE.

RICHARD H. KRALL AND JOHN ELMER DUTT, OF ALLENTOWN, PENNSYLVANIA.

WINDOW-SCREEN OR OTHER SLIDE.

SPECIFICATION forming part of Letters Patent No. 426,620, dated April 29, 1890.

Application filed May 29, 1889. Serial No. 312,435. (No model.)

*To all whom it may concern:*

Be it known that we, RICHARD H. KRALL and JOHN ELMER DUTT, citizens of the United States, residing at Allentown, in the county of Lehigh, State of Pennsylvania, have invented certain new and useful Improvements in Window-Screen or other Slides, of which the following is a specification, reference being had therein to the accompanying drawings.

Our invention has relation to a novel form of slide-frame for use in window-screens, extension-tables, and in other connections.

The object of our invention is the provision of a cheap and easily-adjusted form of slide which shall not weaken the structure and shall be secure from coming apart, and in which there shall be the least possible friction even where the sliding portions of the frame are skewed out of the common plane by the action of a deviating force. To this end we have constructed our device in the manner set forth in the following specification, and with the novel features set forth in the claims at the end of the same.

In the drawings, Figure 1 is a front elevation of a portion of a sliding window-screen adapted to be fitted into any window and to open and close within the sashes of the same. Fig. 2 is a perspective of a corner of a window-screen, showing our rolling stop and the method of holding the same in place. Fig. 3 is an end view of the side frame of a window-screen or other sliding device, showing the insertion near said end of our improved rolling stop.

In the drawings we have shown our sliding device as applied to a window-screen; but our invention is applicable to any device in which there are two frames sliding one upon or within the other.

In Fig. 1 A is one of such frames and B the other, one of these frames lying outside of or under the other. The contiguous faces of these frames at the sides are provided with longitudinal grooves, as B', a similar groove being made in the face of the frame A and lying directly over said groove B'. Near the ends of these grooves are inserted stops, indicated in dotted lines at A' and B² of Fig. 1. The direction of these stops tends to draw the frames tightly together, as well as to afford a small friction-surface in the sliding grooves, thus rendering these frames peculiarly fit for use in mosquito frames or screens. To lessen the friction of these stops as far as possible and at the same time to insure the same security as to holding the two parts of a sliding frame together, we use disks (preferably of metal) D, held between pins or lugs D'. There is a disk of this kind in each section of a sliding frame, and the pins D' really come together, instead of the disks, thus insuring the antifrictional action of the rollers or disks under all circumstances.

It will be seen that in the case of the disks there will be a rolling instead of a sliding friction between the faces of the grooves, and this anti-frictional action will be all the stronger when by any accidental means the two frames are skewed slightly out of place, as often occurs. This skewing presses the faces of the grooves against the disks, and thus insures the smooth rolling of the same, and hence causes no additional friction whatever.

At F in Fig. 1 is shown a cross-bar projecting from the end, or near there, of one of the frames of the screen. This cross-bar is for the purpose of stopping the movement of the frames when carried in the position opposite to that shown in Fig. 1.

What we claim is—

1. A sliding frame having oppositely-canted grooves in its sides and having stops secured in said grooves, consisting of disks and pins for securing the same, in combination with a second frame having grooves in its sides adapted to register with the grooves in the first frame and canted so as to continue the direction of said grooves, and disk-stops secured between pins within said latter grooves, said pins arranged to come together to prevent frictional contact of said disk, as set forth.

2. In combination with a sliding frame provided with registering canted grooves, a plane stop of a disk shape secured within said grooves and having pins upon each side thereof in the groove, substantially as specified.

In testimony whereof we affix our signatures in presence of two witnesses.

RICHARD H. KRALL.
J. ELMER DUTT.

Witnesses:
C. H. MOYER,
SAM S. MOYER.